Jan. 29, 1929.
S. L. BRIGHT
1,700,430
METHOD AND APPARATUS FOR COOLING LIQUIDS
Filed Aug. 20, 1927
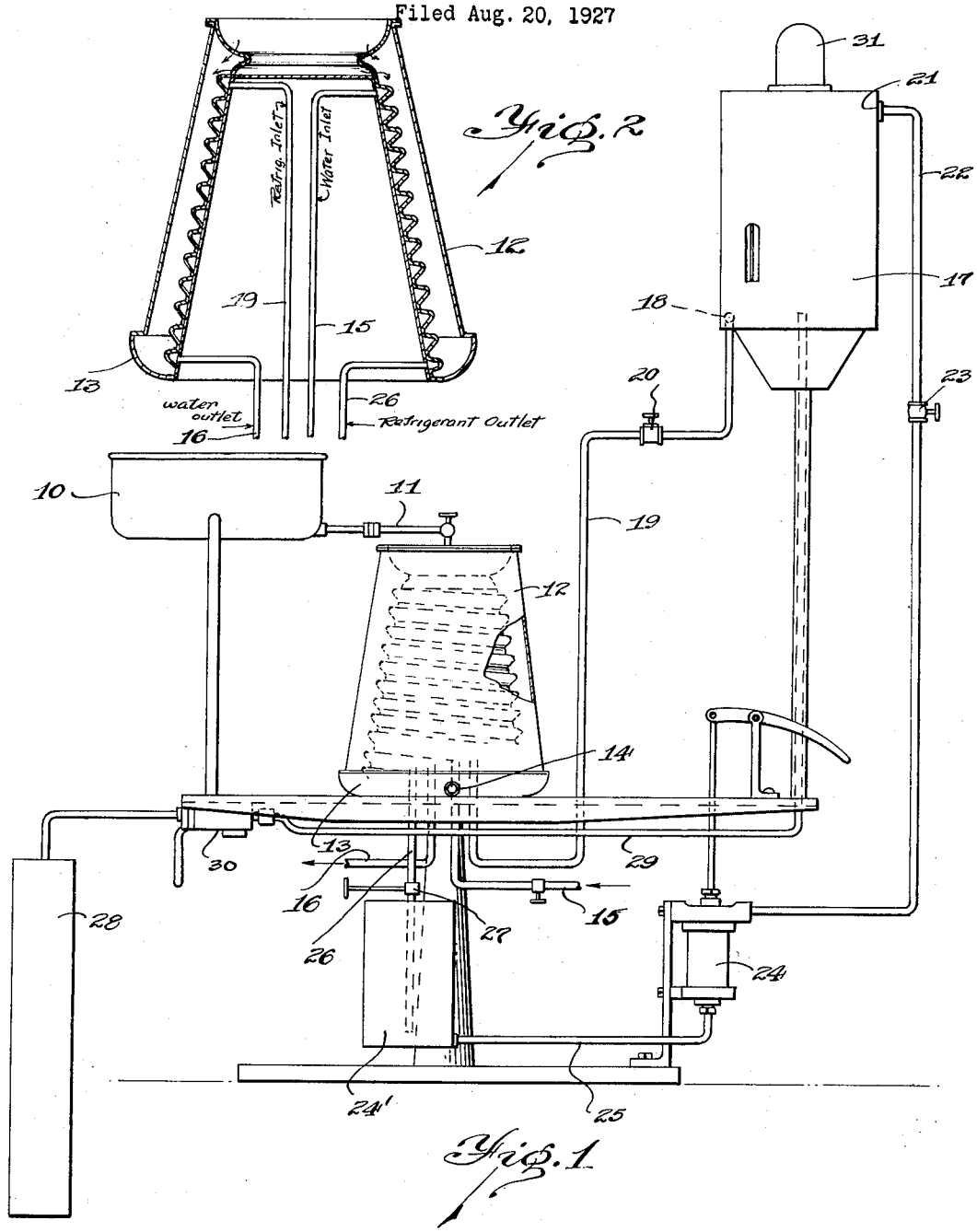
INVENTOR.
Seth L. Bright,
BY Whittemore Hulbert
Whittemore & Belknap
ATTORNEY.

Patented Jan. 29, 1929.

1,700,430

UNITED STATES PATENT OFFICE.

SETH L. BRIGHT, OF DETROIT, MICHIGAN, ASSIGNOR TO G. F. LATHROP AND JOHN J. DODGE, BOTH OF DETROIT, MICHIGAN.

METHOD AND APPARATUS FOR COOLING LIQUIDS.

Application filed August 20, 1927. Serial No. 214,394

The invention relates to a method and apparatus for cooling liquids and more particularly in improvements in an apparatus of this character which materially effects economy in the use of a refrigerant and expedites the cooling operation to a great extent.

The device finds particular utility in dairies for cooling milk and is especially desirable in localities where ice is not a natural resource and artificial ice is hard to obtain.

It is therefore the primary object of my invention to provide a cooling apparatus designed to decrease the temperature of the milk without the use of ice, and to such an extent that the same may be transported over comparatively long distances free from bacteria. Thus by virtue of the present invention dairy production is encouraged and rendered possible in localities where it has heretofore been considered impractical. In the type of coolers now more or less universally employed, water is relied upon to lower the temperature of the milk. However, it has been found that in actual practice this temperature is not sufficiently low to warrant shipping any appreciable distance.

For the purpose of effecting economy the present invention contemplates an arrangement whereby the same refrigerant may be used throughout various cycles or in other words, to cool a comparatively large quantity of milk.

In practicing my improved method, the milk or other liquid to be cooled is permitted to flow over a water cooled container into a suitable receptacle. This operation functions to lower the temperature of the liquid to the temperature of the water. However, as heretofore pointed out, this temperature is not sufficiently low and accordingly the water is drained from the container and a refrigerating medium is substituted therefor, whereupon the milk or liquid is again conducted to the container and further cooled.

The several objects and advantages of this invention and a detailed description of the several steps of the method as well as an apparatus for carrying out the method will be made more apparent as this description proceeds, especially when considered in connection with the accompanying drawings wherein, Figure 1 illustrates semi-diagrammatically the apparatus for cooling the liquid, and Figure 2 is a fragmentary vertical sectional view showing the cooling container.

While obviously the particular form and structural details of the apparatus employed for cooling the liquid should in nowise be considered as limiting the broad interpretation of the present invention, nevertheless one form of such apparatus which in practice has been found to give extremely efficient results is illustrated herein somewhat in detail.

By referring to the drawings, it will be noted that the numeral 10 designates a receptacle adapted to contain the liquid to be cooled and is provided at the lower end thereof with a valve controlled passage 11, which extends outwardly from the receptacle to a point adjacent to and above the container 12 so that the liquid may be directed upon the latter. As shown this container is preferably, although not necessarily, frusto-conical in shape and is formed with a series of spirally arranged corrugations in its periphery, the exterior surface of which constitutes a circuitous passage for the liquid to be cooled and the interior surface provides for the passage of the cooling medium. Arranged upon the lower end of the container for collecting the liquid after the same has been cooled is a suitable trough 13 having an outlet port 14 through which the liquid may pass into a receptacle. As heretofore pointed out, water is the first medium used to cool the milk or liquid from body heat to water temperature, and accordingly the container is provided with an inlet passage 15 through which water is admitted into the container to the convolutions of the corrugations and 16 designates the outlet passage for this cooling medium.

After the milk or liquid is water cooled, it is again placed into the receptacle 10 and a cooling medium such as brine chilled by a refrigerant is introduced into the container. For accomplishing this result, I provide a tank 17 adapted to contain a solution of brine and is provided at the lower end thereof with an outlet port 18 which is connected to the interior of the container 12 by means of the pipe 19 having a valve 20 therein. The tank is further provided with an inlet port 21 connected by means of the pipe 22 having a valve 23 therein to the pressure side of a pump 24, the suction side of the pump 24 being connected by means of the pipe 25 to a receiving receptacle 24', which as shown receives one end of the pipe 26 having the valve 27 therein. The pipe 26 connects into the container 12 and constitutes an outlet pipe for the brine. With such an arrangement the same brine may be used to cool various quantities of liquid as after the cooling medium is drained from the container by manipulating the valve 27, it may be pumped back into the brine tank by means of the pump 24.

For chilling the brine, I provide a tank 28 adapted to contain a refrigerant under pressure which is conveyed through a pipe 29 having a valve 30 therein, to the brine tank 17. The refrigerant, upon operating the valve 30, flows directly into the brine and expands therein to thus cool the same and escapes through the top of the tank. Thus inasmuch as the gas is supplied directly into the brine tank under pressure and escapes through the top thereof, it is desirable to provide some means for separating or segregating the brine from the refrigerant. This is accomplished in the present instance by means of the separator 31, which may be of any suitable construction, but preferably of the type illustrated in my co-pending application Serial No. 214,396 filed co-incident herewith. It will further be noted that the amount of refrigerant admitted to the brine tank must be regulated so that the brine may be maintained in a liquid state, and so that the liquid to be cooled will not be frozen. To assist the operator in determining the amount of refrigerant necessary to cool the brine to the desired temperature I provide a thermometer upon the brine tank which will accurately indicate the temperature of the same.

While it is believed that the operation of the device will be thoroughly understood from the foregoing description a brief outline of the same will be given herein as follows. Water is first admitted through the passage 15 into the spirally arranged passages formed by the corrugations on the container 12 to cool the same, and the valve controlling the passage 11 is opened permitting the fluid or milk to be cooled to flow down the exterior surface of the container into the trough 13 where it is collected by any suitable receptacle and placed back into the container 10, the valve controlling the passage 11 being closed. The water is then drained from the container and the valve 20 is opened permitting the refrigerating medium contained in the tank 17 to flow through the passages formed in the interior of the container, the valve controlling the pipe 11 is then opened and the liquid contained in the receptacle which is now at water temperature is further cooled by flowing over the circuitous passage formed in the periphery of the container. After the liquid has been thoroughly cooled, the valve 27 is opened permitting the refrigerant to drain into the container 24' from which it may be pumped back into the tank 17 by means of the pump 24.

Thus from the foregoing it will be immediately apparent to those skilled in this art that the herein described apparatus affords an economical process of cooling a liquid, and while the apparatus herein suggested as suitable for use in carrying out this process may be used to advantage, nevertheless it will be immediately obvious that various other types of apparatus may be employed in connection with this process with equal facility. As a consequence, reservation is made to make such changes in the essentials and non-essentials of this invention as may come within the purview of the accompanying claims.

What I claim as my invention is:

1. In a device of the class described, the combination with a container, of means for admitting a first cooling medium into the container to initially cool the same, and means operable after the completion of the initial cooling for admitting a second cooling medium into the container for further cooling the same.

2. In a device of the class described, the combination of a container over which a liquid to be cooled is adapted to flow, said container having a passage therein for a cooling medium, means for admitting water and the like into said passage for initially cooling the liquid and means operable thereafter for admitting a second cooling medium into said passage, said second cooling medium having a temperature lower than said first mentioned cooling medium, whereby the liquid is further cooled.

3. In a device of the class described, the combination with a container having spirally arranged corrugations in its periphery thereof providing a circuitous path for the liquid to be cooled and further providing a passage for the cooling medium, means for admitting a cooling medium into said passage for initially cooling the liquid, and means for subsequently admitting a solution of chilled brine into said passage to further cool the liquid.

4. In the method of cooling a liquid those steps which consist in directing the liquid to be cooled over a surface, initially cooling the surface with a relatively inexpensive cooling medium and thereafter independently cooling the surface with a solution of chilled brine.

5. In the method of cooling a liquid those steps which consist in flowing the liquid to be cooled over a surface while cooling the same with a relatively inexpensive cooling medium, withdrawing said cooling medium and subsequently running the liquid to be cooled over the container a second time while cooling the surface with a solution having a temperature substantially lower than the first mentioned cooling medium.

6. In the method of cooling a liquid those steps which consist in flowing the liquid to be cooled over a surface while cooling the same with a relatively inexpensive cooling medium, withdrawing said cooling medium and subsequently running the liquid to be cooled over the container a second time while cooling the container with a solution of chilled brine, withdrawing the brine from the container and pumping the same back to its source whereby it may be used a second time for cooling the liquid.

7. In the method of cooling a liquid, those steps which consist in directing the liquid to be cooled over a surface having a passage for cooling mediums, intially cooling said surface by passing a relatively inexpensive cooling medium through said passage, chilling a second cooling medium by refrigeration, and further cooling said surface by passing said second cooling medium through said passage.

8. In the method of cooling a liquid, those steps which consist in directing the liquid to be cooled over a surface provided with a passage for cooling mediums, initially cooling said surface by passing water through said passage, chilling a brine solution by refrigeration and subsequently further cooling said surface by passing said brine through said passage.

In testimony whereof I affix my signature.

SETH L. BRIGHT.